UNITED STATES PATENT OFFICE.

HERMANN WAGNER AND JAKOB KOHLHAAS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED WOOL DYESTUFF AND PROCESS OF MAKING SAME.

1,071,833.     Specification of Letters Patent.     Patented Sept. 2, 1913.

No Drawing.     Application filed December 4, 1912. Serial No. 734,268.

*To all whom it may concern:*

Be it known that we, HERMANN WAGNER, Ph. D., chemist, and JAKOB KOHLHAAS, Ph. D., chemist, citizens of the Empire of Germany, residing at Höchst-on-the-Main, Germany, have invented certain new and useful Improvements in Red Wool Dyestuff and Processes of Making Same, of which the following is a specification.

We have found that a dyestuff dyeing wool red tints of great fastness to milling is obtained by combining the tetrazo compound of m-tolidin with 2 molecular proportions of 2-naphthol-6-sulfonic acid.

The procedure for manufacturing the new dyestuff is for example as follows: The tetrazo compound, produced from 284 kilos of m-tolidin hydrochlorid is added to a solution, alkaline with sodium carbonate, of 500 kilos of sodium 2-naphthol-6-sulfonate. When the coupling is complete the new dyestuff is salted out, pressed and dried. The product has the formula:

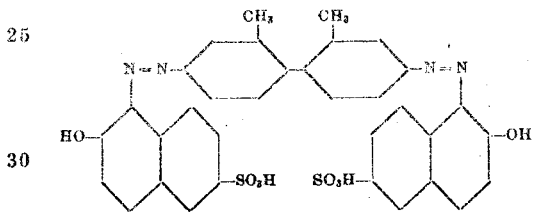

It is a red powder, dissolving in concentrated sulfuric acid with a carmine-red color, its solution in hot water solidifying after cooling into a red gelatinous mass, and dyeing wool beautiful red tints, remarkable for their fastness to milling.

Having now described our invention, what we claim is:

1. The process of manufacturing a red wool dyestuff fast to milling, which consists in causing the tetrazo compound of m-tolidin to act upon 2 molecular proportions of 2-naphthol-6-sulfonic acid.

2. As a new product, the dyestuff of the formula:

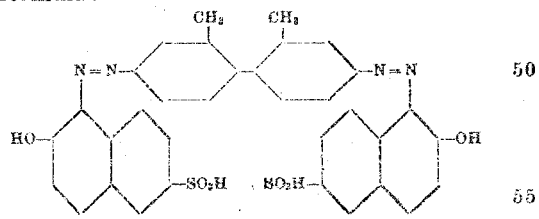

being a red powder, dissolving in concentrated sulfuric acid with a carmine-red color, its solution in hot water solidifying after cooling into a red gelatinous mass, and dyeing wool beautiful red tints, remarkable for their fastness to milling.

In testimony whereof, we affix our signatures in presence of two witnesses.

HERMANN WAGNER.
JAKOB KOHLHAAS.

Witnesses:
JEAN GRUND,
CARL GRUND.